Patented May 26, 1936

2,041,712

UNITED STATES PATENT OFFICE 2,041,712

ART OF COATING

Glen S. Hiers, Pittsburgh, Pa., assignor to Collins & Aikman Corporation, Philadelphia, Pa., a corporation of Delaware No Drawing. Application April 25, 1931, Serial No. 532,993

12 Claims. (Cl. 134—17)

My invention relates to aqueous sols having a dispersed rubber phase solidifiable into coatings or objects which are thereafter insoluble in water and are reconverted into sols only with difficulty, and a leading object of my invention is to regulate the relationship between the viscosity of the sol and the concentration of the colloid therein. By my improvements there may be produced latex compounds having viscosities rendering them suitable for coating loosely woven textile fabrics without concentration above normal of the rubber colloids, without substantial modification of the colloidal condition of the rubber hydrocarbon, and without loading the compounds with large amounts of inert fillers.

I have found that by the addition to such sols of minute quantities of certain polysaccharids in a readily miscible aqueous solution or dispersion, the viscosity of the sol may be increased above normal and the concentration of the rubber colloids in the sol may be decreased much below that of natural latex without substantially impairing the strength, tenacity, ageing and holding power of a solidified film of the material. These results may be accomplished while retaining substantially the same total solids content in the latex or latex composition as is present in much less viscous compositions having substantially similar concentrations of rubber colloids, and my improvements consequently avoid the deleterious effects inherent in the addition of considerable amounts of inorganic fillers or of materials which in themselves, or in combination with latex, will gel.

My invention is particularly applicable to the treatment of latices of rubber and related gums, and compounds thereof, for application to the back of pile fabrics to secure the pile tufts in a loosely woven backing. In the production of such fabrics it is essential that the coating sol have sufficient viscosity to avoid penetration thereof through the loosely woven backing to the face of the fabric and it is also desirable that the coating sol have such low concentration of solidifiable solids as to form a thin flexible film which is impervious, free of bubbles or substantial quantities of loading mtaerial, and inseparable from the fabric because of the penetration of the substantially unmodified colloidal particles into the pores of and interstices between the fibres.

Rubber latex in its natural state normally contains from 30% to 35% of rubber colloidally dispersed in water. The viscosity of such latex is but little greater than water and at normal temperatures tends to penetrate through textile fabrics. If applied in practicable quantities, it not only tends to penetrate to the face of the fabric, but forms a coating of greater rubber content, body and thickness that is necessary or desirable for many uses. The concentration of the rubber colloids up to 50% or more, or the addition of anti-oxidants, accelerators, vulcanizers or fillers, has little effect upon the viscosity of the material unless used in such large quantities as to decrease materially the adhesion, anchoring power and ageing of the coating and to result in a still heavier and less flexible coating than the latex alone. Entrapping air in the latex results in an unstable viscosity and produces a porous film when solidified.

In accordance with my invention, the aqueous phase of the sol is preferably diluted so as to decrease the concentration of rubber colloids per volume of sol and the aqueous phase is rendered abnormally viscous without affecting the colloidal condition of the rubber or introducing such volume of loading material as tends to dissipate the cohesive force of the rubber in cementing such particles together. The product is used without creaming or separation or concentration of the rubber colloids.

The viscosifying materials suitable for the practice of my invention are such as are compatible with and do not tend to coagulate rubber. They must form, with water, solutions or sols having, in 0.5% aqueous concentration at 23° C., a viscosity of not less than 40 seconds as measured on a Saybolt viscosimeter within one hour after dispersion in water and which dry to a non-tacky, friable, non-oleaginous film. The quantity of the viscosifying material used should not exceed 10% of the dry weight of the rubber colloids in the coating composition and for textile coatings, I preferably select substances having sufficiently high viscosities in solution to require the use of less than 2 parts dry weight of viscosifier to 100 parts dry weight of rubber even when the rubber colloids constitute but 20% by weight of the sol.

Due to the lower percentage of rubber solids present per volume of fluid coating, the film when dried on the fabric is much thinner and more flexible than films resulting from the application of equal volumes of latex compounds having normal rubber colloids concentrations. The use of minute quantities of viscosifying agent in accordance with my invention does not cause porosity of the film such as results from the use of gels and their subsequent removal by washing, (viz., starches, glues, casein, gelatin, agar or flaxseed extract), or of thickeners (viz., dextrine, gum arabic, althea, mesquite gum, india gum, slippery elm or other demulcents) all of which must be used in undesirable quantities to have any substantial viscosifying effect. The dissipation of the cohesive power of the rubber colloids such as results from the use of inert fillers is also avoided by my improvements.

Since the polysaccharids used in my invention are dispersible in water, and are hydrolyzed into soluble saccharids in acidulated water, any free polysaccharid may be washed out in the acid dye bath concurrently with the dyeing of the pile of the fabric or may be washed out independently.

The viscosifiers which I have found suitable for the practice of my invention are polysaccharids containing or decomposable into an uronic acid. Pectin, gum tragacanth, sodium alginate and ammonium alginate and acid polysaccharids which I have found suitable under conditions where the addition of viscosifying material need not be kept at a very low minimum; but I have found it most satisfactory to use galagum or derivatives thereof known as galagum C and emulsone, which are white, odorless, tasteless powders derived from vegetable gums extracted from carob seed. (See Analytical Edition of Industrial & Engineering Chemistry, July 15, 1930, pp 329–331 and April 15, 1931, pp. 210–212). From a consideration of their ash, their ready conversion to an uronic acid, the nature of their hydrolysis products and oxidations to mucic acid, they have been found to contain small quantities of acid polysaccharids.

By the use of the foregoing substances in amounts not in excess of 10% of the rubber solids in the case of pectin, not in excess of 6% of the rubber solids in the case of gum tragacanth and the alginates, and down to as low as 1½% of the rubber solids in the case of carob seed derivatives known commercially as galagums and emulsone, I am enabled to control the viscosity of latex for spreading, dipping, spraying and like purposes without substantially altering the desirable properties inherent in films of unmodified latex, and to secure a degree of viscosity comparable to that resulting from the addition of about 67% of gum arabic or 125% of dextrine. The use of such small quantities of viscosifiers as required by my invention avoids the deterioration resulting from the use of large quantities of thickeners which decreases the tensile strength, ageing, elasticity and cohesion of the rubber, and leaves a porous and discontinuous film if washed out of the solidified film.

I have found that, in the practice of my invention, it is desirable, where a sol having low rubber concentration of high viscosity is desired, to dilute rubber latex, or a compound thereof, with an aqueous dispersion of the viscosifying material dispersed in sufficient water to render it readily miscible with latex and give simultaneously the required decrease in the concentration of rubber colloids and the desired viscosity. As an illustration of a preferred practice, there was slowly stirred into 286 grams of latex from Hevea brasilliensis (35% solids) 214 grams of 0.7% (seven-tenths per cent.) solution of galagum, so that there was added an amount of galagum equal to about 1½% by weight of the rubber solids in the latex. The addition of this aqueous solution so diluted the sol as to decrease the rubber colloid from 35% to about 20%, by weight, in the compound, and the viscosity of the compound was increased from about 43 seconds on a Saybolt viscosimeter to about 280 seconds at 23° C. The aqueous solution containing the viscosifying agent preferably also contains a base, such as ammonia or alkali metal hydroxide, and may also contain vulcanizing, accelerating, and anti-oxidizing substances, or these materials may be added to the latex or to the final mixture.

The coating composition so produced was sufficiently viscous not to penetrate through the back to the face of a pile fabric to which it was applied, although the predyed backing in the pile fabric was so loosely woven as to be incapable alone of holding firmly the animal fibre pile tufts and hence unsuitable for its intended use without coating. The coatings are solidified and the rubber vulcanized preferably in an enclosed dryer at comparatively low temperatures. The pile was subsequently dyed with hot acid dye, which hydrolyzed and removed any free viscosifying material and left a thin impervious film securely anchoring the pile.

Having described my invention, I claim—

1. In the art of coating, the step which consists in spreading upon a permeable surface an unhydrolyzed, uncreamed composition of matter comprising an aqueous sol having an abnormal viscosity as compared with normal stabilized latex and a subnormal concentration of solidifiable rubber colloids as compared with the minimum concentration in normal latex.

2. In the art of coating, the step which consists in spreading upon a permeable surface an unhydrolyzed, uncreamed composition of matter comprising an aqueous sol containing rubber colloids more dispersed than the normal concentration in normal latex and having a viscosity not less than the viscosity of normal latex.

3. In the art of coating, the step which consists in spreading upon a permeable surface of a plush fabric an unhydrolyzed, uncreamed composition of matter comprising an aqueous sol containing a rubber colloid and a carob seed derivative, said composition containing rubber colloids more dispersed than the normal concentration in normal latex and having a viscosity not less than the viscosity of normal latex.

4. In the art of coating with latex compositions, the steps which consist in decreasing the concentration of the rubber colloids below that of the minimum concentration in normal latex and increasing the viscosity above that of normal latex by the addition of a viscosifying water dispersible polysaccharid in an amount less than two percent by weight of the rubber content, and spreading the composition upon a permeable textile.

5. In the art of coating, the steps which consist in applying to the back of a plush fabric, a composition containing rubber colloids and a viscosifying water dispersible polysaccharid, said composition containing rubber colloids more dispersed than the normal concentration in normal latex and having a viscosity not less than the viscosity of normal latex; solidifying the rubber colloids in situ on the fabric, dyeing the pile, and washing out any free polysaccharid or saccharids derived therefrom by hydrolysis or splitting during dyeing or washing.

6. In the art of coating, the steps which consist in combining a sol containing rubber colloids in substantially normal latex concentration with a dilute aqueous solution or dispersion containing polysaccharids in an amount less than two percent of the rubber content of the sol by weight and having a viscosity in excess of the viscosity of normal latex and spreading the combined materials upon a permeable fabric.

7. In the art of coating with uncreamed latex compositions, the steps which consist in decreasing the concentration of the rubber colloids below that of the minimum concentration in normal latex and increasing the viscosity of the composition above the viscosity or normal latex by the addition of an amount less than two per cent by weight of the rubber content of a viscosifier selected from carob seed derivatives containing small quantities of acid polysaccharids, and spreading the composition upon a permeable textile.

8. In the art of coating, the steps which consist in applying to a plush fabric an uncreamed composition containing rubber colloids in aqueous dispersion and a viscosifier selected from the group of pectin, gum tragacanth, alginates, or carob seed derivatives in an amount less than ten per cent by weight of the rubber solids, said composition having an abnormal viscosity as compared with normal stabilized latex and a subnormal concentration of solidifiable rubber colloids as compared with the minimum concentration in normal latex.

9. In the manufacture of latex compositions, the step which consists in decreasing the concentration of the rubber colloids below that of normal natural latex and increasing the viscosity above that of normal natural latex by the addition of an acid polysaccharid in an amount less than two percent by weight of the rubber content, and depositing and solidifying the rubber from the composition without creaming such composition.

10. In the art of manufacturing rubber products, the steps which consist in forming an aqueous rubber compound containing a viscosifying, water dispersible acid polysaccharid, depositing from the composition and solidifying the rubber content with the polysaccharids dispersed therein, and washing out any free polysaccharid.

11. In the art of manufacturing rubber products, the steps which consist in combining a sol containing rubber colloids in substantially normal latex concentration with a dilute aqueous solution or dispersion containing acid polysaccharids in an amount less than two percent of the rubber content of the sol by weight and having a viscosity in excess of the viscosity of normal latex, and depositing the rubber colloids and polysaccharids from the composition without creaming such composition and solidifying the rubber with the polysaccharids dispersed therein.

12. The method which consists in combining an aqueous dispersion of rubber, gum from the seeds of plants of the botanical groups ceritonia siliqua and conaphallus konjah and water in such proportions that the rubber colloids in the mixture have a concentration less than the minimum (say 30%) concentration of rubber colloids present in normal latex and the gum is less than two percent by weight of the rubber colloids present in the mixture, said mixture having a viscosity at least several times the viscosity of the aqueous rubber dispersion alone when measured on a Saybolt viscosimeter, and depositing and solidifying the rubber content without creaming.

GLEN S. HIERS.